UNITED STATES PATENT OFFICE.

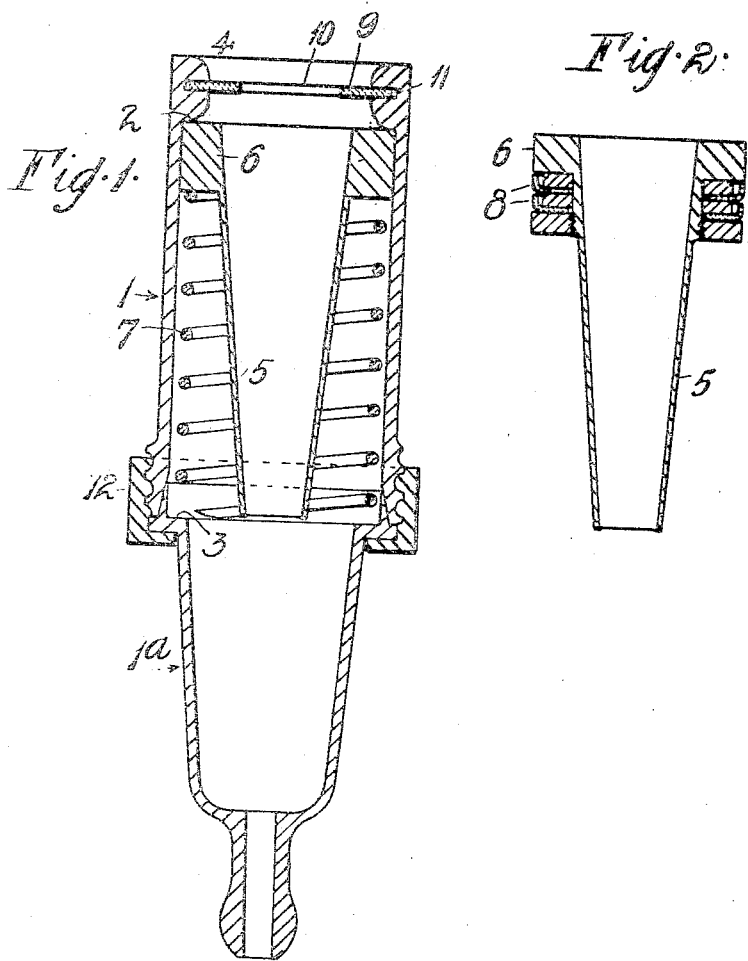

ALEXANDER GILLIES, OF HEIDELBERG, AND HAROLD BARTRAM, OF MELBOURNE, VICTORIA, AUSTRALIA.

PNEUMATICALLY-OPERATED TEAT-CUP.

1,124,886.

Specification of Letters Patent. Patented Jan. 12, 1915.

Application filed April 21, 1914. Serial No. 833,397.

*To all whom it may concern:*

Be it known that we, ALEXANDER GILLIES, a subject of the King of Great Britain, residing at "Glencairn," Templestowe Road, Heidelberg, in the State of Victoria, Australia, and HAROLD BARTRAM, a subject of the King of Great Britain, residing at 586–588 Bourke street, Melbourne, in the State of Victoria, aforesaid, have invented Improvements in Pneumatically-Operated Teat-Cups, of which the following is a specification.

The object of this invention is to provide a simple and efficient pneumatically-operated teat cup which may be easily kept sweet and clean, in contradistinction to cups which are formed partially or wholly of rubber, and is, moreover, more durable and reliable, as there are no rubber or flexible linings to renew.

Briefly stated, the casing of the cup is provided with a rigid, or approximately rigid, teat sleeve which is preferably independent of the casing and made of metal, and which is capable of reciprocation therein, preferably in synchronism with the pulsations caused by alternate suction and air.

According to one practical form, the teat sleeve is spring-controlled and is adapted to be drawn down against the tension of the spring during the suction period of the pulsation cycle, and to be returned by the spring during the air admission period thereof.

The head of the sleeve is so made as to insure a good sliding fit within the casing, and it may have piston rings, springs, or the like, with or without one or more cup leathers.

If desired, the mouth-piece of the cup may be provided with a flexible teat grip.

In order to avoid repetition, the word "metal" in this specification is to be taken as including any other suitable rigid or approximately rigid material.

The invention is illustrated by the accompanying drawings whereof—

Figure 1 is a vertical section through one form of a cup embodying the improvements. Fig. 2 is a detail of the teat sleeve, showing one suitable form of head therefor.

Referring to Fig. 1, the "metal" casing of the teat cup is preferably made in two parts, viz: a cylindrical upper part 1, and a tapered lower part 1ª, which are detachably connected together by a flanged screw-cup or collar 12, such construction permitting the cup to be readily taken to pieces for cleaning purposes. At its upper end, the casing is provided with a mouth-piece 4, adjacent which is an internal shoulder 2, a second internal shoulder 3 being produced in the casing at the junction of the aforesaid parts 1 and 1ª.

The "metal" teat sleeve 5 is preferably tapered, as illustrated, and is formed with a head 6, neatly fitting the cylindrical part of the casing, between which head and the lower shoulder 3 a spring 7 is placed to normally support the sleeve and maintain its head against the upper shoulder 2.

The head 6 of the sleeve may be made like a piston, and fitted with practically air-tight packings, as, for instance, by means of cup leathers 8, as illustrated in Fig. 2; or the head may be plain, as in Fig. 1, if a good fit can be assured. A suitable teat grip for the mouth-piece may consist of a flexible disk 9, with a central hole 10, fitted into an annular groove 11 formed interiorly in the mouth-piece, as in Fig. 1.

In operation, the suction causes the teat sleeve 5 and, consequently, the teat, to be drawn slightly downward, while the casing moves in the opposite direction, at which time the milk flows.

When the air is admitted, the casing drops, and the spring 7 returns the sleeve, thus producing a reciprocating movement and, consequently, a massaging effect on the teat somewhat similar to handmilking.

We claim:—

1. A teat cup for pulsating milking machines comprising a casing, and a teat sleeve capable of reciprocation therein in synchronism with the pulsations.

2. A teat cup for pulsating milking machines comprising a casing, and a teat sleeve capable of reciprocation therein in synchronism with the pulsations, said sleeve having a head neatly fitting said casing.

3. A teat cup for pulsating milking machines comprising a casing, and a tapered teat sleeve capable of reciprocation therein in synchronism with the pulsations.

4. A teat cup for pulsating milking machines comprising a casing, and a spring-supported teat sleeve capable of reciprocation therein in synchronism with the pulsations.

5. A teat cup for pulsating milking machines comprising a casing provided with a mouth-piece and with upper and lower internal shoulders located, respectively, near said mouth-piece and near the center of the casing, a teat sleeve capable of reciprocation within said casing and provided at its upper end with a head, and a supporting spring for said sleeve interposed between the lower shoulder and said head.

6. A teat cup for pulsating milking machines comprising a casing which consists of a cylindrical upper part and a tapered lower part detachably connected together, and a tapered teat sleeve capable of reciprocation in said casing.

7. A teat cup for pulsating milking machines comprising a casing provided with a mouth-piece formed with a groove, a flexible teat grip seated in said groove and formed with a central opening, and a teat sleeve capable of reciprocation within said casing.

In testimony whereof we have hereunto set our hands in presence of two subscribing witnesses.

ALEXANDER GILLIES.
HAROLD BARTRAM.

Witnesses:
EDWARD WATERS,
EDWARD N. WATERS.